United States Patent [19]

Boyd

[11] Patent Number: 5,040,905
[45] Date of Patent: * Aug. 20, 1991

[54] ELASTOMERIC COMBINED SEAL AND SPRING

[75] Inventor: Richard M. Boyd, St. Louis Park, Minn.

[73] Assignee: Quadion Corporation, Minneapolis, Minn.

[*] Notice: The portion of the term of this patent subsequent to Jun. 14, 2005 has been disclaimed.

[21] Appl. No.: 549,253

[22] Filed: Jul. 6, 1990

Related U.S. Application Data

[63] Continuation of Ser. No. 340,433, Apr. 19, 1989, abandoned, which is a continuation of Ser. No. 106,445, Oct. 9, 1987, abandoned.

[51] Int. Cl.$^5$ .......................... F16C 33/74; F16J 9/00; F16J 15/56
[52] U.S. Cl. ..................... 384/130; 277/165; 277/168; 277/177; 277/192; 277/206 A; 384/140; 384/153
[58] Field of Search .................. 277/206 A, 165, 168, 277/177, 192, 206 R, 146, 216, 222, 211, 209; 384/130, 140, 153, 152

[56] References Cited

U.S. PATENT DOCUMENTS

| | | | |
|---|---|---|---|
| 1,900,849 | 3/1933 | Ackerman | 384/153 |
| 2,700,561 | 1/1955 | Svenson | 277/206 A |
| 2,873,132 | 2/1959 | Tanner | 277/206 A |
| 2,877,070 | 3/1959 | Lee | 277/165 |
| 2,909,398 | 10/1959 | Taylor | 277/206 A X |
| 2,968,501 | 1/1961 | Tisch . | |
| 2,983,533 | 5/1961 | Tisch | 277/206 A |
| 3,300,225 | 1/1967 | Shepler . | |
| 3,418,001 | 12/1968 | Rentschler et al. | 277/206 A X |
| 3,494,624 | 2/1970 | Woodling . | |
| 3,542,380 | 11/1970 | Klein et al. | 277/206 A X |
| 3,622,168 | 11/1971 | Woodling | 277/206 A X |
| 3,642,293 | 2/1972 | Woodling | 277/206 A |
| 4,020,910 | 5/1977 | Peterson et al. . | |
| 4,151,999 | 5/1979 | Ringal et al. . | |
| 4,206,930 | 6/1980 | Thrane et al. . | |
| 4,428,589 | 1/1984 | Reinsma . | |
| 4,557,487 | 12/1985 | Banas et al. | 277/206 A X |
| 4,580,790 | 4/1986 | Doost . | |
| 4,750,847 | 6/1988 | Boyd | 277/206 A X |
| 4,764,035 | 8/1988 | Boyd | 384/152 |
| 4,878,766 | 11/1989 | Boyd | 384/130 |

FOREIGN PATENT DOCUMENTS

| | | | |
|---|---|---|---|
| 2057027 | 5/1972 | Fed. Rep. of Germany | 277/165 |
| 2432181 | 1/1976 | Fed. Rep. of Germany | 277/165 |
| 666349 | 6/1979 | U.S.S.R. | 277/165 |
| 627085 | 7/1949 | United Kingdom | 277/165 |
| 762232 | 11/1956 | United Kingdom | 277/206 A |
| 1442819 | 7/1976 | United Kingdom | 277/165 |

*Primary Examiner*—Allan N. Shoap
*Attorney, Agent, or Firm*—Schroeder & Siegfried

[57] ABSTRACT

An elastomeric combined seal and spring formed of uniformly resilient flowable rubber-like material and comprised of a one-piece annular body of uniform cross-sectional configuration throughout, which is of generally right angled polygonal shape and having a pair of opposed concave working surfaces spaced a distance only 60%-70% of its maximum radial dimension, measured at its corners, and its convex corners having a convexity of only 14%-16% of said maximum radial dimensions, the concavity of said surfaces being 17%-30% of said maximum radial dimensions, thereby providing an elastic seal which will function as a forgiving spring in support of a self-adjusting, self-lubricating split-ring annular bearing and thereby perfect a lasting seal against an annular surface while the latter is moving relative thereto at high speeds for prolonged periods.

20 Claims, 2 Drawing Sheets

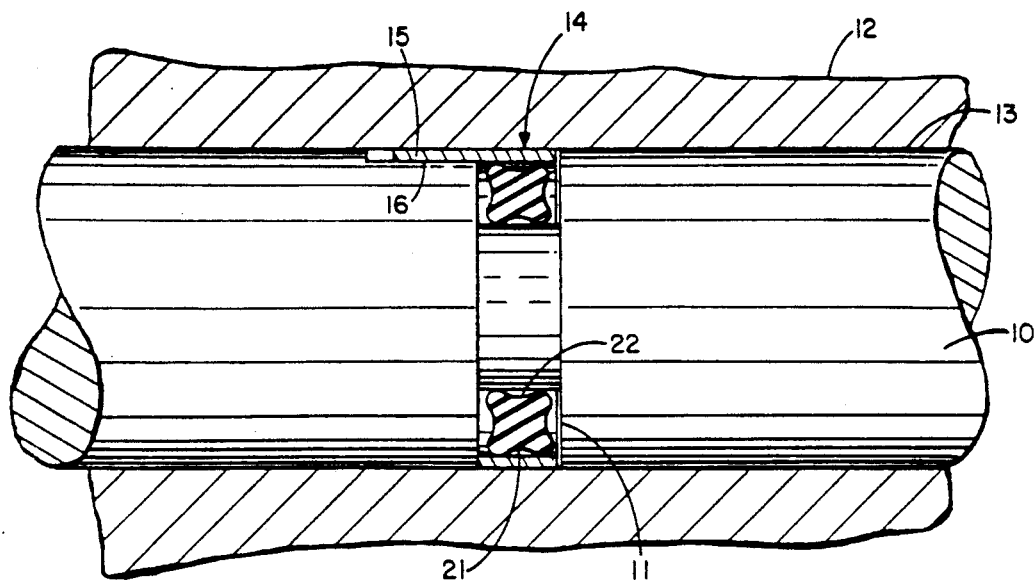
FIG. 1
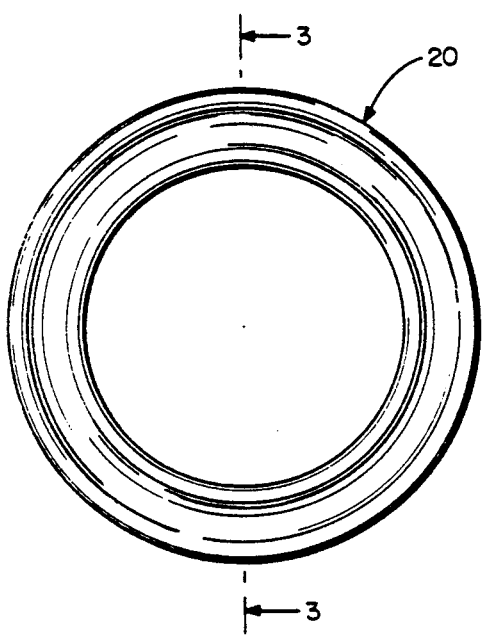
FIG. 2
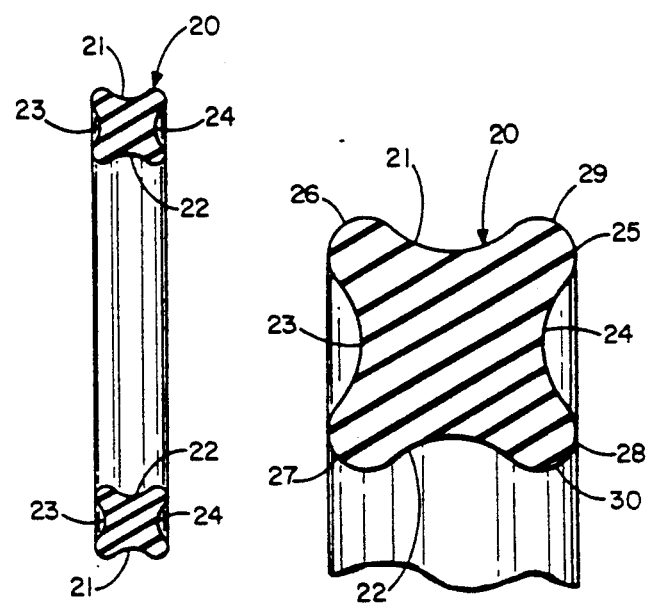
FIG. 3
FIG. 4

ELASTOMERIC COMBINED SEAL AND SPRING

This is a continuation of application Ser. No. 07/340,433 filed by me on Apr. 19, 1989, now abandoned, and entitled "Elastomeric Combined Seal and Spring" which, in turn, is a continuation of application Ser. No. 07/106,445 filed by me on Oct. 9, 1987, now abandoned, and also entitled "Elastomeric Combined Seal and Spring." Applicant claims the benefits of 35 U.S.C. §120 with respect to each of said prior applications.

BACKGROUND OF THE PRIOR ART

High-speed, rotating metal parts have created lubrication, and consequently wear, problems for many years for the reason that they must be housed in metal bearings having a different coefficient of expansion. As a direct result thereof, the high speeds of rotation generate heat despite adequate lubrication between the parts, with the result that the opposed metal parts expand at a different rate, which permits the lubrication to escape from the gear box in which it is contained. Once the lubrication escapes, substantial wear is experienced and the installation is doomed if the movement is continued. Similar problems are experienced with respect to installations utilizing high speed reciprocating movements.

Seals located between such metal parts in the form of bearings, for accommodating such high speed relative movement over prolonged periods, can be advantageously formed of recently developed materials which have a high degree of inherent lubrication. Thus, a bearing product sold under the trademark VESPEL, although very costly and one which must be machined, will function as a seal under such conditions, provided it is urged gently and firmly but continuously against the sealing surface without excessive pressure, the latter being a cause of undue wear. However, experience has shown that no construction heretofore conceived or known would adequately furnish such a seal because no way was known for providing such gentle pressure continuously and substantially uniformly between metal parts having standard variations in dimensions, and over all of the temperature ranges generated during long periods of high speed movements. No way was known for automatically adjusting such pressure to compensate for dimensional changes over the gamut of temperature variations created within such parts.

BRIEF SUMMARY OF THE INVENTION

I have found that any thermoplastic or thermosetting material having inherent self-lubricating qualities with a pressure velocity value of no less than 1800 at 100 feet per minute surface speed will generally provide an acceptable bearing for prolonged periods of high-speed movements, if it can be designed so that it will dimensionally adjust to dimensional changes caused by different coefficients of expansion and can be properly supported for that purpose. I have found that this can be accomplished by providing a resilient support for the bearing which will furnish the desired amount of pressure behind the bearing surface so as to maintain an adequate seal at the sealing surface without such pressure being excessive and hence without resultant undue wear, for all variations in the dimensions of the relatively moving parts and in the grooves in which such seals are to be installed. I have conceived of an elastomeric back-up sealing ring having critical dimensions which will satisfactorily adjust such pressure throughout the gamut of various speeds and variations in dimensions of the metal parts, of the groove, and of the ring itself.

While compositions such as VESPEL have been known for sometime and while their self-lubricating features have been recognized, I have found that a mere annular bearing of such material will not compensate adequately for different coefficients of expansion of opposed different metals. As a consequence, I have utilized a split-ring bearing which permits the circumference of the bearing to alter. However, I have found that even a split-ring bearing will not function adequately except under limited circumstances wherein the sealing surface of the bearing having the high degree of lubricity is urged against the sealing surface lightly but firmly and evenly, despite variations in original dimensions of the installation components and variations caused by generated heat. Even moderate pressures thereupon will cause undesirable wear circumstances. Although I have sought to utilize standard O-rings or QUAD-Rings of standard sizes and configurations, I have found that none of them will function satisfactorily for they either fail to apply adequate pressure initially, or they apply excessive pressures to the bearing when generated heat causes dimensional changes, because they either overfill the groove or become essentially a non-compressible rectangle, and thus exert greater radial pressure upon the bearing than it will withstand without undue wear.

I have found that if the bearing member is comprised of a material having inherent self-lubricating qualities with a pressure velocity value of no less than 1800 at 100 feet per minute surface speed and is made in the form of a split-ring so that it can adjust circumferentially, and if an elastomeric back-up ring made of readily flowable material such as rubber and of proper critical dimensions is provided, then a long-lasting and effective seal for prolonged high speed movements can be provided. To obtain such a seal, I have designed the elastomeric back-up ring to be polygonal in cross-section, of substantially equal transverse dimensions, with convex corner lobes and opposed concave sides, the degrees of concavity and convexity and the maximum and minimum radial dimensions having predetermined values within critical ranges. The back-up ring is substantially symmetrical in cross-sectional shape.

The critical radial distance between the two opposed radially spaced working surfaces of the ring is within the range of 60%-75% of the maximum radial distance between opposed corners at one side of the ring, preferably at 68%. The corner lobes have a radius of convexity of 14%-16% of the same maximum radial distance between said corners, preferably at 16%. The concavity of the two opposed working surfaces is at 17%-33% of that distance, preferably at 28%. I have found that an elastomeric ring having such a combination of features functions in a superior manner in that it is sufficiently yielding so that it will compensate adequately for all differences in dimensional changes caused by different coefficients of expansion and for all variations in initial dimensions, without excessive radial pressure being applied upon the bearing. The relatively deep concavities of the opposed working surfaces and the sharp convexity of the adjacent corners create a yielding or forgiving pressure upon the backside of the bearing seal, which permits the latter to readily adjust to variations in dimensions without undue variations in pressure at the seal. Thus, an adequate seal is provided, without undue heat or wear. I believe that the rubber of the convex corner lobes flows into the relatively deep concavities of the adjacent working surfaces and that the latter provide ample space therefor so as to avoid the formation of a rectangular block of rubber, which is flowable but not compressible. Instead, the elastomeric ring continues to exert a gentle pressure upon the back side of the bearing seal which approximates the pressure supplied at the initial installation. Since the back-up ring is designed so as to provide a gentle and yieldable pressure of approximately 1.9-3.0 pounds per square inch, and this pressure is maintained at a substantially constant level by the above described flow of rubber, the sealing bearing will continue to provide an adequate seal across the entire gamut of the changes of circumference of the sealing bearing without excessive wear.

BRIEF DESCRIPTION OF THE DRAWINGS

A detailed description of one preferred embodiment of the COMBINED SEAL AND ELASTOMERIC SPRING is hereafter described with specific reference being made to the drawings, in which:

FIG. 1 is a vertical sectional view of a bearing, with a shaft shown in elevation therein for rotation at high speeds, and one of my combined seal and elastomeric springs installed in a groove of the shaft behind a self-lubricating bearing-seal;

FIG. 2 is a side elevational view of one of my combined seal and elastomeric springs in its free or non-compressed form;

FIG. 3 is a vertical sectional view taken along line 3—3 of FIG. 2;

FIG. 4 is a cross-sectional view on an enlarged scale of the ring shown in FIGS. 2 and 3;

DETAILED DESCRIPTION OF THE INVENTION

Figure 5:
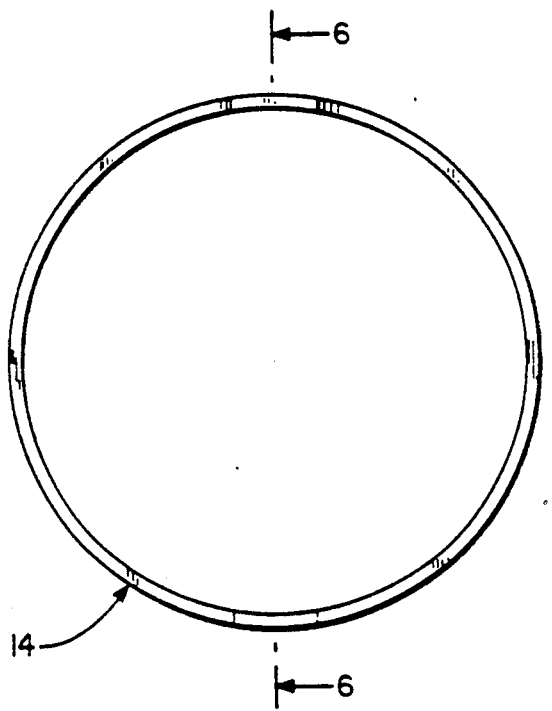
FIG. 5 is a side elevational view of the bearing-seal shown in FIG. 1 in its free form.

FIG. 1 shows an insulation utilizing one of my combined seal and elastomeric springs. As shown, it includes a rapidly rotating metal shaft 10 which has an annular groove 11 formed in its exterior surface opposite a metal bearing member 12 which surrounds the shaft 10 while the latter is rotated at high speeds over prolonged periods of time. Typically, the bearing 12 has a different coefficient of expansion than the metal from which the shaft 10 is formed and, consequently, the dimensional changes which result from the high speed and consequent elevations of temperature in each of these metals differ widely. As a consequence, the slight space which is provided between the two members 10 and 12, indicated as 13, which permits lubrication therebetween, varies substantially in its dimension. Such substantial variations in dimensions permit the lubricant to escape. As a result thereof, the bearing member 12 will be destroyed unless provision for preventing the escape of the lubricant is made.

To meet the above requirements, I provide sealing means which includes a split-ring bearing-seal member 14, which has an exterior circumference substantially equal to the bearing surface of the bearing 12, at the space 13. This split-ring bearing member is self-adjusting and is formed of a self-lubricating material having self-lubricating qualities with a pressure velocity of no less than 1800 at 100' per minute surface speed. As shown in FIG. 1, it is flat and is generally rectangular in cross-sectional configuration and includes a tang 15 which extends axially outwardly therefrom into an opening 16 formed in the shaft 10 to accommodate same. This tang ensures that the bearing member 14 rotates with the shaft 10 within the bearing 12.

Figure 6:
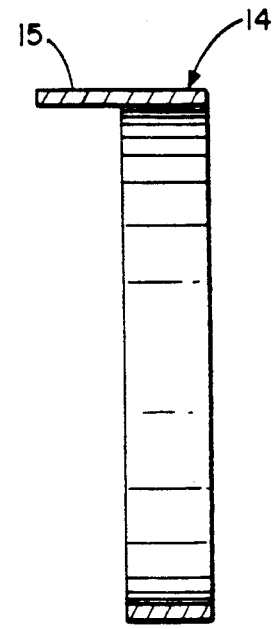
FIG. 6 is a vertical sectional view of the bearing-seal, taken along line 6—6 of FIG. 5.
Figure 7:
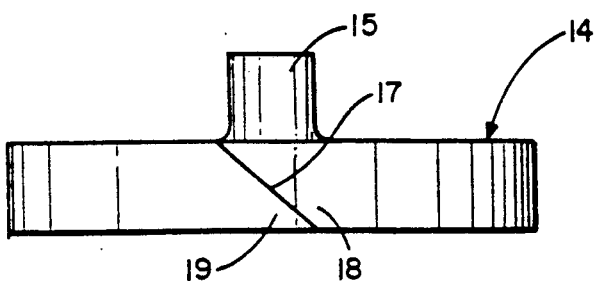
FIG. 7 is a top plan view of the bearing-seal shown in FIGS. 5 and 6.

The split-ring bearing member 14 is shown in detail in FIGS. 5-7. As best shown in FIG. 7, it is split along a diagonal line 17 so that it has free end portions 18 and 19 which can move relative to each other, both circumferentially and axially, thereby providing automatic adjustment to the dimensional changes resulting from changes of temperature, when properly urged outwardly by my combined seal and elastic spring, which is shown between bearing 14 and the bottom of the groove 11. It will be seen that the bearing 12 and the shaft 10 provides support structure for the seal perfected therebetween by the structure as shown in FIG. 1.

Disposed within the groove 11 in supporting relation to the bearing-seal 14 is one of my combined seal and elastomeric springs, indicated generally by the numeral 20. This combined seal and elastomeric spring is comprised of a one-piece annular body which has a generally right angled pologonal configuration in cross-section, and is made of a flowable resilient material, such as rubber. In our practice, we utilize an elastomeric composition in lieu of actual rubber. This ring 20 is of uniform cross-sectional shape throughout and, as best shown in FIGS. 3-4, is symmetrical. It will be seen that the ring 20, has opposed concave sides 21 and 22, which are working surfaces and are radially spaced. It also has a pair of axially spaced concave sides 23 and 24. Each of these concave sides merges generally tangentially with the convex corner lobes of the ring identified by the numerals 25-28.

The minimum radial dimension of the ring 20 as measured between the bottom of the concavities of the two opposed radially spaced sides 21 and 22, is 60%-75% of the maximum normal radial dimension between said working surfaces. This maximum radial dimension is measured as the maximum distance between the two opposed corners on either side of the ring, as for example, the distance between points identified by the numerals 29 and 30, in FIG. 4. The preferable range of this minimum radial dimension is 65%-70% of said maximum radial dimension and the ideal minimum radial dimension at the bottom of the opposed cavities is 68% of that maximum radial dimension.

The corner lobes 25-28, inclusive, have convexities of 14%-16% of the maximum radial distance between the working surfaces 21 and 22. The preferred convexity is 16% of that maximum radial dimension.

The concavities of each of the four sides 21-24, inclusive, is substantial. These concavities may extend between a range of 17%-33% of the maximum normal radial dimension of the ring, as hereinbefore defined. The preferred range is 24%-30% of that dimension and the ideal range is 27%-29% of the same dimension. The preferred single dimension is 28% of the maximum normal radial dimension between the working surfaces.

With the dimensions as defined above, I have found that I can provide an effective, long lasting seal between metal surfaces, moving past each other at high speeds over prolonged periods. This movement can be the rotation of one part past another as shown in FIG. 1, or may be a reciprocating motion where, for example, the seal is mounted in the exterior surface of a piston and would appear as shown in FIG. 1. The design of the combined seal and elastomeric spring, such as the ring 20, is such as to provide a gentle back-up pressure upon the flat bearing-sealing member 14 throughout the entire range of temperature, and consequent dimensional changes, experienced in such metal parts when operated at high speeds over prolonged periods. Thus, when such parts become heated, substantial dimensional changes take place, with the result that the bearing and sealing member 14, which is continually urged outwardly by the critically-dimensioned ring 20, will adjust circumferentially to compensate therefor. This is accomplished by a change in circumference of the bearing and sealing member permitted by shifting of the free ends 18 and 19 thereof relative to each other. At the same time, the combined sealing and elastomeric spring, in the form of the annular elastic ring 20, will adjust its amount of compression within the groove. It will be noted that the dimensions of the groove also will be altered by the changes in temperature. These changes, plus the dimensional variations in the initial construction of the shaft, the groove, the bearing, and the ring itself, comprise total variations for which compensations are extremely difficult. I have found, however, that a ring having dimensions within the critical ranges set forth herein, when utilized in combination with a combined seal and bearing, such as the member 14, will adequately compensate for such changes.

I believe that when such adjustments are required, the elastomeric material from which the ring 20 is manufactured flows into the substantial concavities 21-24, inclusive, which are provided in each of the sides of the ring. Since this material is readily flowable, but non-compressible, I have avoided the problem heretofore experienced with the standard QUAD-ring or O-ring, none of which can adequately adjust to support such a bearing and sealing member across the temperature ranges experienced, without applying undue pressure thereagainst, with consequent prohibitive wear.

It will be seen that the ring 20 also perfects a seal across the bottom of the groove 11, as well as at its top. Thus, it functions both as a seal and as an elastomeric spring which is sufficiently sensitive and yielding to ensure, in combination with the bearing 14, an adequate seal between the two relatively moving parts 10 and 12, over the entire temperature range experienced in such installations when operated at various high speeds.

In considering this invention, it should be remembered that the present disclosure is illustrative only and the scope of the invention should be determined by the appended claims.

What is claimed is:

1. A combined seal and elastomeric spring for use in supporting relation with a self-lubricating bearing comprising:
   (a) a one piece annular body composed of uniformly resilient, flowable rubber-like material throughout and constructed and arranged to be fitted into a sealing groove of ring-like configuration in supporting relation to an annular split-ring type bearing member with inherent self-lubricating qualities;
   (b) said body having a generally right-angled polygonal cross-sectional configuration and having a pair of concave radially spaced surfaces and a pair of concave axially spaced surfaces;
   (c) said body having convexly curved corner portions merging substantially tangentially with the concavities of said surfaces;
   (d) one of said pair of surfaces constituting working surfaces each of which in its non-compressed state having a radius of concavity approximating 24%-30% of the maximum normal cross-sectional dimension between said pair of surfaces;
   (e) the minimum cross-sectional dimensions between said concave working surfaces in their non-compressed state being no more than 60%-70% of the maximum normal cross-sectional dimensions between said working surfaces.

2. A combined seal and elastomeric spring for use in supporting relation with a self-lubricating bearing comprising:
   (a) a one-piece annular body of uniform, resilient flowable rubber-like material throughout and constructed and arranged to be fitted into a sealing groove of ring-like configuration in supporting relation to an annular split-ring type bearing member with inherent self-lubricating qualities;
   (b) said body having a generally right-angled polygonal cross-sectional configuration and having a pair of concave radially spaced surfaces and a pair of concave axially spaced surfaces;
   (c) said body having convexly curved corner portions merging substantially tangentially with the concavities of said surfaces; and
   (d) one of said pair of surfaces constituting work surfaces and having minimum dimensions therebetween in its non-compressed state being 60%-70% of the maximum normal dimensions therebetween.

3. The structure defined in claim 2, wherein said body is substantially symmetrical in cross-sectional configuration.

4. The structure defined in claim 2, wherein the radius of concavity of each of said working surfaces is preferably 27%-29% of the maximum normal cross-sectional dimension between said working surfaces.

5. The structure defined in claim 2, wherein the radius of concavity of each of said working surfaces is approximately 28% of the maximum normal cross-sectional dimension between said working surfaces.

6. The structure defined in claim 2, wherein the minimum radial dimensions between said concave working surfaces is approximately 65% of the maximum radial cross-sectional dimension between said working surfaces.

7. The structure defined in claim 2, wherein the said working surfaces are spaced radially.

8. The structure defined in claim 2, wherein the minimum cross-sectional dimensions between said concave working surfaces is approximately 65% of the maximum normal cross-sectional dimension between said working surfaces.

9. The structure defined in claim 2, wherein the maximal axial dimension of said body equals the maximum radial dimension of said body when the latter is in its non-compressed state.

10. The structure defined in claim 2, wherein the radii of concavity of said surfaces in their non-compressed state are equal.

11. The structure defined in claim 2, wherein the minimum radial cross-sectional dimensions between said concave working surfaces is approximately 65%-70% of the maximum radial cross-sectional dimensions between said working surfaces.

12. The structure defined in claim 2 wherein the minimum cross-sectional dimension between said concave working surfaces is approximately 68% of the maximum normal cross-sectional dimensions between said working surfaces.

13. A combined seal and elastomeric spring for use in supporting relation with a self-lubricating bearing comprising:
   (a) a one-piece annular body composed of uniformly resilient, flowable rubber-like material throughout and constructed and arranged to be fitted into a sealing groove of ring-like configuration in supporting relation to an annular split-ring type bearing member with inherent self-lubricating qualities;
   (b) said body having a generally right-angled polygonal cross-sectional configuration and having a pair of concave radially spaced surfaces and a pair of concave axially spaced surfaces;
   (c) said body having convexly curved corner portions merging substantially tangentially with the concavities of said surfaces; and
   (d) one of said pair of surfaces constituting working surfaces and in their non-compressed state each having a radius of concavity approximating 17%-30% of the maximum normal dimension between said working surfaces;
   (e) a pair of metal members mounted for high speed relative movement therebetween and having annular mating bearing surfaces between which said movement takes place;
   (f) an annular groove formed in one of said surfaces;
   (g) said annular body being mounted within said groove at its bottom;
   (h) a split-ring type bearing member being composed of plastic material having inherent self-lubricating qualities with a pressure velocity value of no less than 1800 at 100 feet per minute surface speed;
   (i) said bearing member being mounted within said groove in supported relation to said annular body, and bearing against the other relatively moving metal member opposite said groove;
   (j) the combined radial dimensions of said body and said bearing member being slightly greater than the depth of said groove;
   (k) the axial width of said annular body being less than the axial width of said groove;
   (l) the minimum cross-sectional dimensions between said concave radially spaced surfaces while in their non-compressed state being approximately 60%-70% of the maximum normal cross-sectional dimensions between said radially spaced surfaces.

14. The structure defined in claim 13 wherein said bearing member has adjacent free end portions movable radially and axially relative to each other.

15. The structure defined in claim 13 wherein said annular body is substantially symmetrical in cross-sectional configuration.

16. The structure defined in claim 13 wherein said radially spaced surfaces of said annular body in its non-compressed state have a radius of concavity of approximately 28% of the maximum normal radial dimension between said working surfaces.

17. The structure defined in claim 13 wherein the minimum radial distance between said radially spaces surfaces of said annular body in its non-compressed state is approximately 68% of the maximum normal radial distance therebetween.

18. The structure defined in claim 13 wherein the maximum axial dimensions of said body in its non-compressed state is essentially equal to the maximum radial dimensions of said body.

19. The structure defined in claim 13 wherein said convexly curved corner portions of said annular body in its non-compressed state have a radius of curvature approximating 16% of the maximum normal radial distance between said radially spaced surfaces.

20. The structure defined in claim 13 wherein said convexly curved corner portions of said annular body in its non-compressed state have a radius of curvature approximating 14%-16% of the maximum normal radial distance between said radially spaced surfaces.

* * * * *